(12) United States Patent
Watanabe

(10) Patent No.: US 9,112,783 B2
(45) Date of Patent: Aug. 18, 2015

(54) WIRELESS BASE TRANSCEIVER STATION, COMMUNICATION SYSTEM, AND DATA TRANSFER METHOD

(75) Inventor: Teruyoshi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 778 days.

(21) Appl. No.: 12/778,742

(22) Filed: May 12, 2010

(65) Prior Publication Data

US 2010/0296399 A1 Nov. 25, 2010

(30) Foreign Application Priority Data

May 25, 2009 (JP) ................................. 2009-125303

(51) Int. Cl.
| | | |
|---|---|---|
| H04L 12/26 | (2006.01) | |
| H04L 12/801 | (2013.01) | |
| H04L 12/851 | (2013.01) | |
| H04L 12/823 | (2013.01) | |
| H04W 28/10 | (2009.01) | |
| H04W 28/14 | (2009.01) | |

(52) U.S. Cl.
CPC ............... *H04L 47/10* (2013.01); *H04L 47/14* (2013.01); *H04L 47/24* (2013.01); *H04L 47/29* (2013.01); *H04L 47/326* (2013.01); *H04W 28/10* (2013.01); *H04W 28/14* (2013.01)

(58) Field of Classification Search
None
See application file for complete search history.

(56) References Cited

U.S. PATENT DOCUMENTS

| | | | | |
|---|---|---|---|---|
| 5,471,671 | A * | 11/1995 | Wang et al. ................. | 455/226.2 |
| 6,603,975 | B1 | 8/2003 | Inouchi et al. | |
| 2004/0027997 | A1* | 2/2004 | Terry et al. .................... | 370/276 |
| 2004/0100965 | A1* | 5/2004 | Proctor et al. ................ | 370/394 |
| 2004/0165530 | A1 | 8/2004 | Bedekar et al. | |
| 2005/0136961 | A1* | 6/2005 | Simonsson et al. ........... | 455/522 |
| 2007/0165526 | A1 | 7/2007 | Lee | |

FOREIGN PATENT DOCUMENTS

| | | |
|---|---|---|
| EP | 1 739 896 | 1/2007 |
| EP | 1739896 A1 * | 1/2007 |
| JP | 11-298492 | 10/1999 |
| JP | 2000-295276 | 10/2000 |
| JP | 2002-57707 | 2/2002 |
| JP | 2007-259031 | 10/2007 |
| JP | 2008-053850 | 3/2008 |

OTHER PUBLICATIONS

Extended European Search Report issued for corresponding European Patent Application No. 101636777, mailed Jul. 23, 2010.
Official Office Action Communication issued for corresponding European Patent Application No. 10 163 677.7 issued Jan. 31, 2012.
Notice of Reasons for Refusal issued for corresponding Japanese Patent Application No. 2009-125303, dispatched Mar. 5, 2013 with partial English translation.

* cited by examiner

*Primary Examiner* — Kouroush Mohebbi
(74) *Attorney, Agent, or Firm* — Myers Wolin, LLC

(57) ABSTRACT

A wireless base transceiver station that transmits and receives data to and from an external device via fixed-line communication and transmits and receives data to and from a mobile station via radio communication. The wireless base transceiver station includes a radio communication unit configured to measure radio quality in a radio zone based on an error rate of data received from the radio zone, and a fixed-line communication unit configured to measure the amount of data flow in a fixed-line zone to perform flow control on data in the fixed-line zone. The wireless base transceiver station includes a control unit configured to control the flow control performed by the fixed-line communication unit, based on the amount of data flow in the fixed-line zone and the radio quality in the radio zone that have been measured by the fixed-line communication unit and the radio communication unit.

17 Claims, 11 Drawing Sheets

WIRELESS BASE TRANSCEIVER STATION, COMMUNICATION SYSTEM, AND DATA TRANSFER METHOD

CROSS-REFERENCE TO RELATED APPLICATIONS

This application is based upon and claims the benefit of priority of the prior Japanese Patent Application No. 2009-125303, filed on May 25, 2009, the entire contents of which are incorporated herein by reference.

FIELD

The present invention relates to wireless base transceiver stations, communication systems, and data transfer methods.

BACKGROUND

Flow control methods for controlling flows of data in mobile communication systems have been known. For example, there is a known method in which a maximum allowable transmission rate in a fixed-line zone is determined based on a transmittable rate in the fixed-line zone and a maximum transmittable rate in a radio zone, the transmittable rate being calculated from a band usage rate in the fixed-line zone (see, e.g., Japanese Laid-Open Patent Publication No. 2007-259031). Also, there is a communication control system that determines flow control parameters for packet transfer in a downlink direction based on traffic volume information for each application, radio communication quality information for each terminal, and communication quality information for each application. The radio communication quality information for each terminal includes information about power down or failure in the terminal, deterioration in radio wave conditions, and uplink radio power. The radio communication quality information is carried on a radio data frame transmitted in an uplink direction from the terminal to a wireless base transceiver station (see, e.g., Japanese Laid-Open Patent Publication No. 2000-295276). Additionally, there is a packet transfer rate control method in which a service class is provided for a guaranteed rate for each user, and a weight assigned to a buffer for each service class is updated at predetermined intervals (see, e.g., Japanese Laid-Open Patent Publication No. 2002-57707).

In the related art described above, an error rate of data received from the radio zone is not taken into account in performing flow control. Therefore, it is difficult to balance the amount of transferable data in the radio zone with the amount of data flow in the fixed-line zone.

SUMMARY

According to an aspect of the invention, a wireless base transceiver station transmits and receives data to and from an external device via fixed-line communication and transmits and receives data to and from a mobile station via radio communication. The wireless base transceiver station includes a radio communication unit configured to measure radio quality in a radio zone based on an error rate of data received from the radio zone, and a fixed-line communication unit configured to measure the amount of data flow in a fixed-line zone to perform flow control on data in the fixed-line zone. The wireless base transceiver station includes a control unit configured to control the flow control performed by the fixed-line communication unit, based on the amount of data flow in the fixed-line zone and the radio quality in the radio zone that have been measured by the fixed-line communication unit and the radio communication unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

Configurations of Communication System And Wireless Base Transceiver Station

Figure 1:
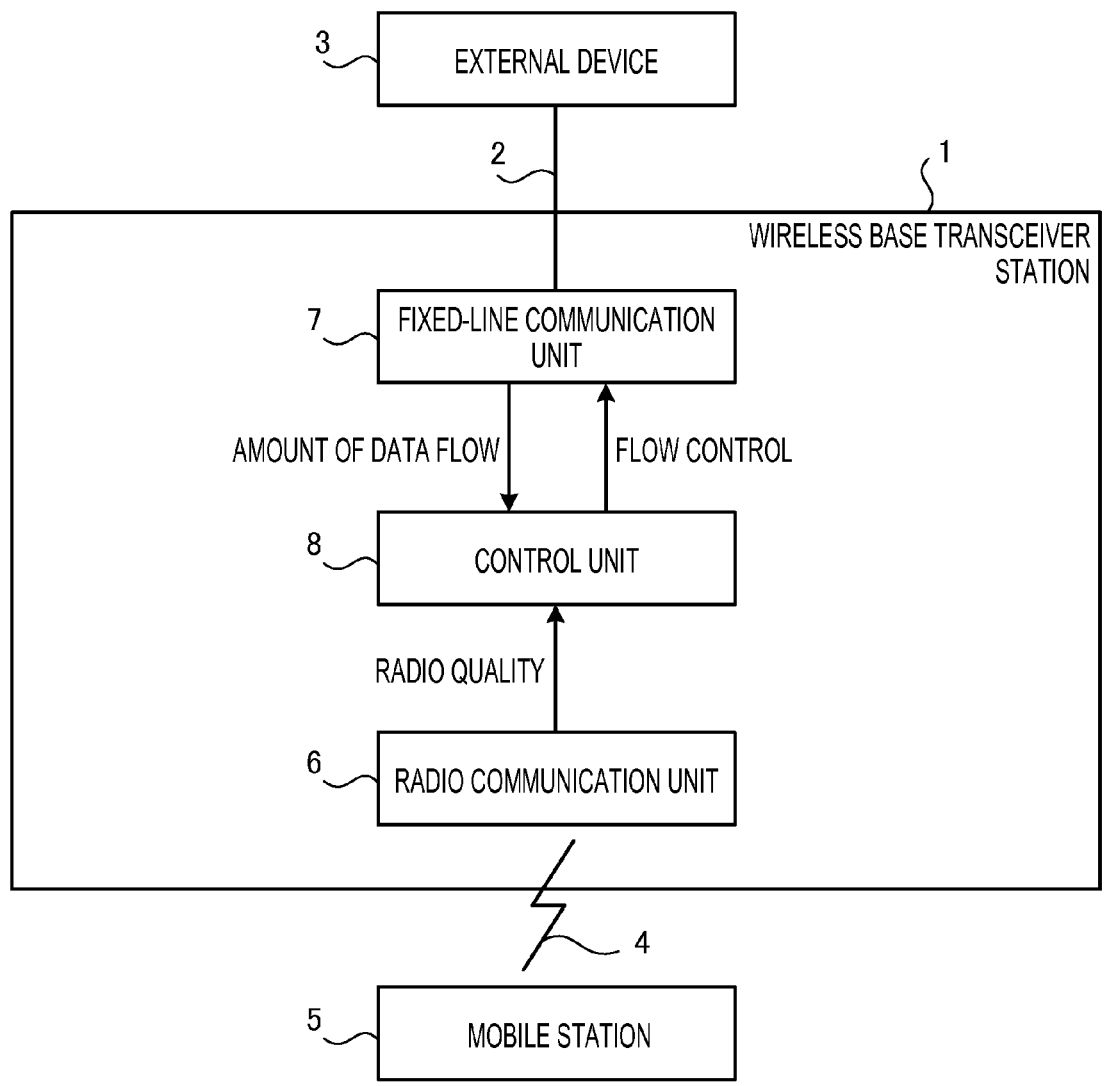
FIG. 1 is a block diagram illustrating a configuration of a communication system according to a first embodiment.

FIG. 1 is a block diagram illustrating a configuration of a communication system according to a first embodiment. As illustrated in FIG. 1, a wireless base transceiver station 1 transmits and receives data to and from an external device 3 through a transmission path 2 via fixed-line communication. The external device 3 may be, for example, an upper device or another wireless base transceiver station. The wireless base transceiver station 1 transmits and receives data to and from a mobile station 5 through a transmission path 4 via radio communication. The wireless base transceiver station 1 includes a radio communication unit 6, a fixed-line communication unit 7, and a control unit 8. The radio communication unit 6 measures radio quality in a radio zone based on an error rate of data received from the radio zone. The radio communication unit 6 reports the measured radio quality to the control unit 8. The fixed-line communication unit 7 measures the amount of data flow in a fixed-line zone. The fixed-line communication unit 7 reports the measured amount of data flow to the control unit 8. The fixed-line communication unit 7 performs flow control on data in the fixed-line zone. Based on the amount of data flow in the fixed-line zone and the radio quality in the radio zone that have been reported from the fixed-line communication unit 7 and the radio communication unit 6, respectively, the control unit 8 controls the flow control performed by the fixed-line communication unit 7.

Data Transfer Procedure

Figure 2:
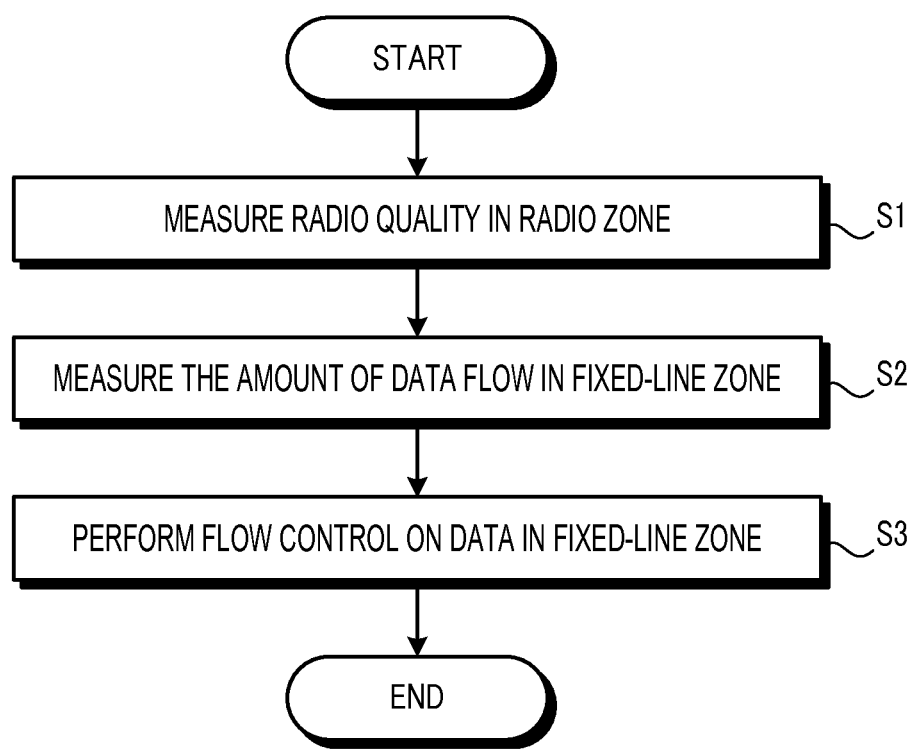
FIG. 2 is a flowchart illustrating a data transfer procedure according to the first embodiment.

FIG. 2 is a flowchart illustrating a data transfer procedure according to the first embodiment. As illustrated in FIG. 2, upon start of a data transfer process, the radio communication unit 6 in the wireless base transceiver station 1 measures radio quality in the radio zone based on an error rate of data received from the radio zone (step S1). The fixed-line communication unit 7 in the wireless base transceiver station 1 measures the amount of data flow in the fixed-line zone (step S2). The step of measuring the amount of data flow may be performed before the step of measuring the radio quality. Alternatively, the step of measuring the radio quality and the step of measuring the amount of data flow may be performed at the same time. Based on the amount of data flow in the fixed-line zone and the radio quality in the radio zone that have been measured by the fixed-line communication unit 7 and the radio communication unit 6, respectively, the control unit 8 and the fixed-line communication unit 7 in the wireless base transceiver station 1 perform flow control on data in the fixed-line zone (step S3). Then, the data transfer process ends.

In the first embodiment, flow control is performed on data in the fixed-line zone based on an error rate of data received from the radio zone. Therefore, the amount of transferable data in the radio zone between the wireless base transceiver station 1 and the mobile station 5 may be balanced with the amount of data flow in the fixed-line zone between the wireless base transceiver station 1 and the external device 3. Thus, even if the radio quality in the radio zone has deteriorated, data to be transferred from the fixed-line zone to the radio zone may be prevented from accumulating in large amounts in the wireless base transceiver station 1. Therefore, it may not be necessary that the wireless base transceiver station 1 be equipped with excessively large buffer memory, thereby reducing both size and cost of the wireless base transceiver station 1.

Second Embodiment

A second embodiment is applied to a communication system that performs packet communication. Examples of the communication system that performs packet communication include asynchronous transfer mode (ATM) systems, long term evolution (LTE) systems, and LTE-advanced systems. LTE is a mobile communication system specification standardized by the 3rd Generation Partnership Project (3GPP). Here, an LTE communication system will be described as an example.

Configuration of Communication System

Figure 3:
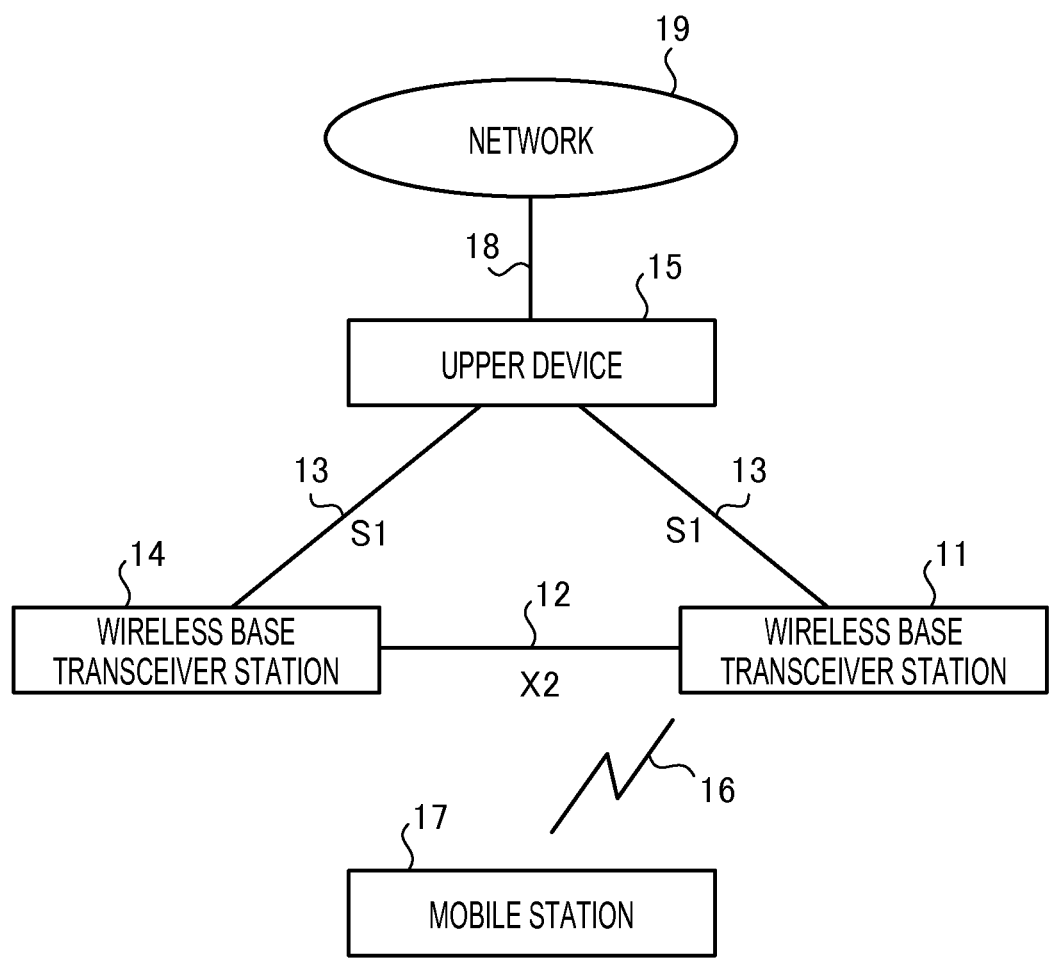
FIG. 3 is a block diagram illustrating a configuration of a communication system according to a second embodiment.

FIG. 3 is a block diagram illustrating a configuration of a communication system according to the second embodiment. As illustrated in FIG. 3, for example, in an LTE communication system, a wireless base transceiver station 11 transmits and receives data to and from external devices, such as another wireless base transceiver station 14 and an upper device 15, through transmission paths 12 and 13 via, for example, fixed-line communication. The upper device 15 may be, for example, a management device, such as a mobility management entity/serving gateway (MME/S-GW). The wireless base transceiver station 11 transmits and receives data to and from a mobile station 17 through a transmission path 16 via radio communication. The upper device 15 is, for example, connected to a network 19 through a transmission path 18 via fixed-line communication.

For example, in the LTE, an inter-device interface called an "S1 interface" is established between the upper device 15 and the wireless base transceiver stations 11 and 14, and an another inter-device interface called an "X2 interface" is established between the wireless base transceiver station 11 and the wireless base transceiver station 14. The internet protocol (IP) is used in the S1 interface and the X2 interface. In a handover of the mobile station 17 from the wireless base transceiver station 14 to the wireless base transceiver station 11, the X2 interface is used when a data packet transmitted from the upper device 15 to the wireless base transceiver station 14 (handover source) is transferred to the wireless base transceiver station 11 (handover target). The wireless base transceiver station 11 (handover target) stores, in its buffer, the data packet transmitted to the wireless base transceiver station 14 (handover source). When data transmission to the mobile station 17 becomes possible, the wireless base transceiver station 11 (handover target) transmits the data packet stored in its buffer to the mobile station 17. In accordance with the amount of used or available buffer space, the wireless base transceiver station 11 performs flow control on data in the fixed-line zone.

Data Transfer Procedure in Communication System

Figure 4:
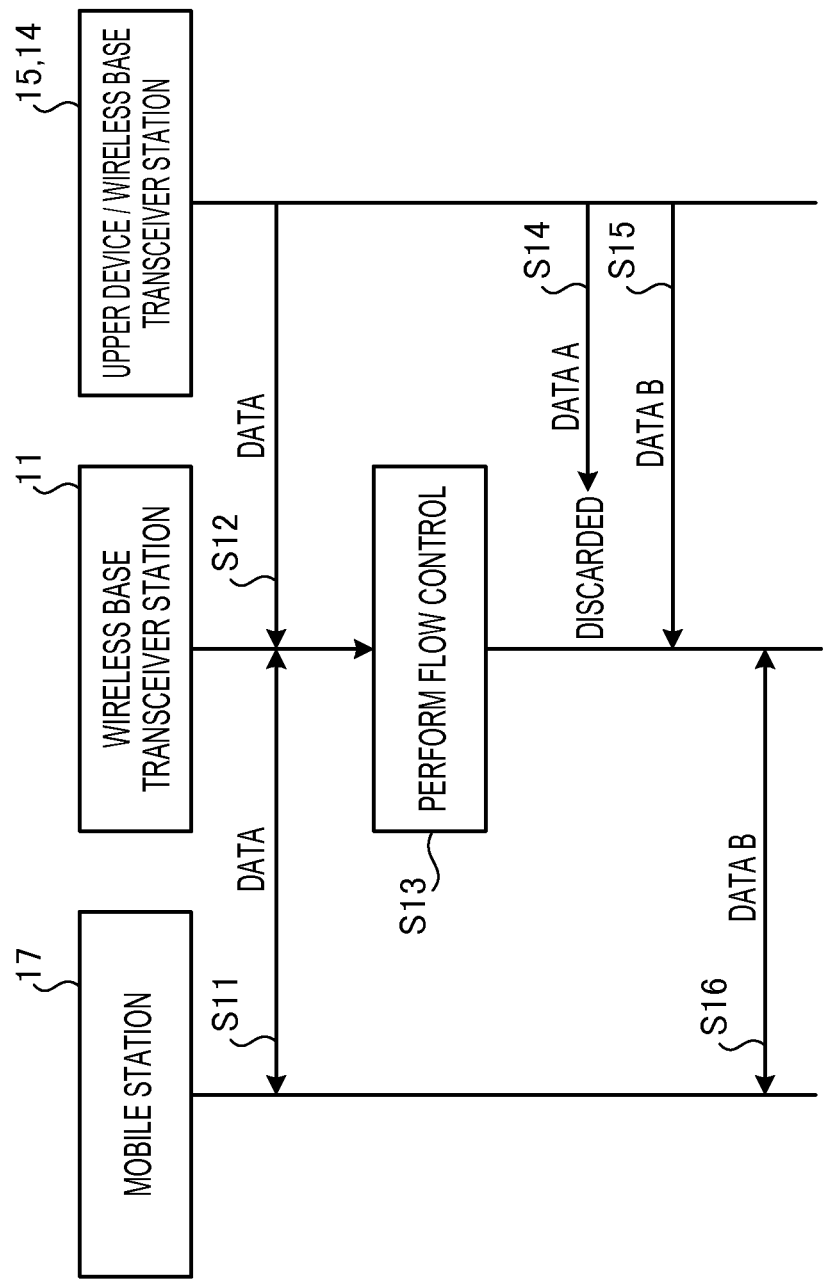
FIG. 4 is a sequence diagram illustrating a data transfer procedure in the communication system according to the second embodiment.

FIG. 4 is a sequence diagram illustrating a data transfer procedure in the communication system according to the second embodiment. As illustrated in FIG. 4, in a data transfer process, the wireless base transceiver station 11 measures radio quality in the radio zone based on an error rate of data received from the radio zone between the wireless base transceiver station 11 and the mobile station 17. Then, the wireless base transceiver station 11 evaluates the radio conditions based on the radio quality (step S11). Additionally, the wireless base transceiver station 11 measures the amount of data flow in the fixed-line zone (S1 interface or X2 interface) between the wireless base transceiver station 11 and the upper device 15 or the wireless base transceiver station 14 (step S12). Based on the radio conditions and the amount of data flow in the fixed-line zone, the wireless base transceiver station 11 determines whether flow control is desired. If flow control is determined to be desired, the wireless base transceiver station 11 performs flow control on data in the fixed-line zone (step S13). If the radio conditions are good, the wireless base transceiver station 11 performs flow control such that a large amount of data may flow from the fixed-line zone into the wireless base transceiver station 11. If the radio conditions are not good, the wireless base transceiver station 11 performs flow control such that the amount of data flowing from the fixed-line zone into the wireless base transceiver station 11 is reduced.

When different priorities are assigned to different pieces of data in the fixed-line zone, the wireless base transceiver station 11 checks the priorities and selects lower-priority data as a target of flow control. In the example of FIG. 4, the priority of data B is higher than that of data A. Therefore, the wireless base transceiver station 11 discards data A (step S14) and accepts data B (step S15). The wireless base transceiver station 11 may discard all or part of data A, and may accept all or part of data B. In any case, the wireless base transceiver station 11 accepts data B having a priority higher than that of data A, and transfers data B to the mobile station 17 (step S16). Even if flow control is performed on target data multiple consecutive times, the amount of the target data flowing into the wireless base transceiver station 11 may not be controlled. In such a case, the wireless base transceiver station 11 regards this as a control abnormality and stops performing flow control on this target data, so that the load on the wireless base transceiver station 11 may be reduced.

Configuration of Wireless Base Transceiver Station

Figure 5:
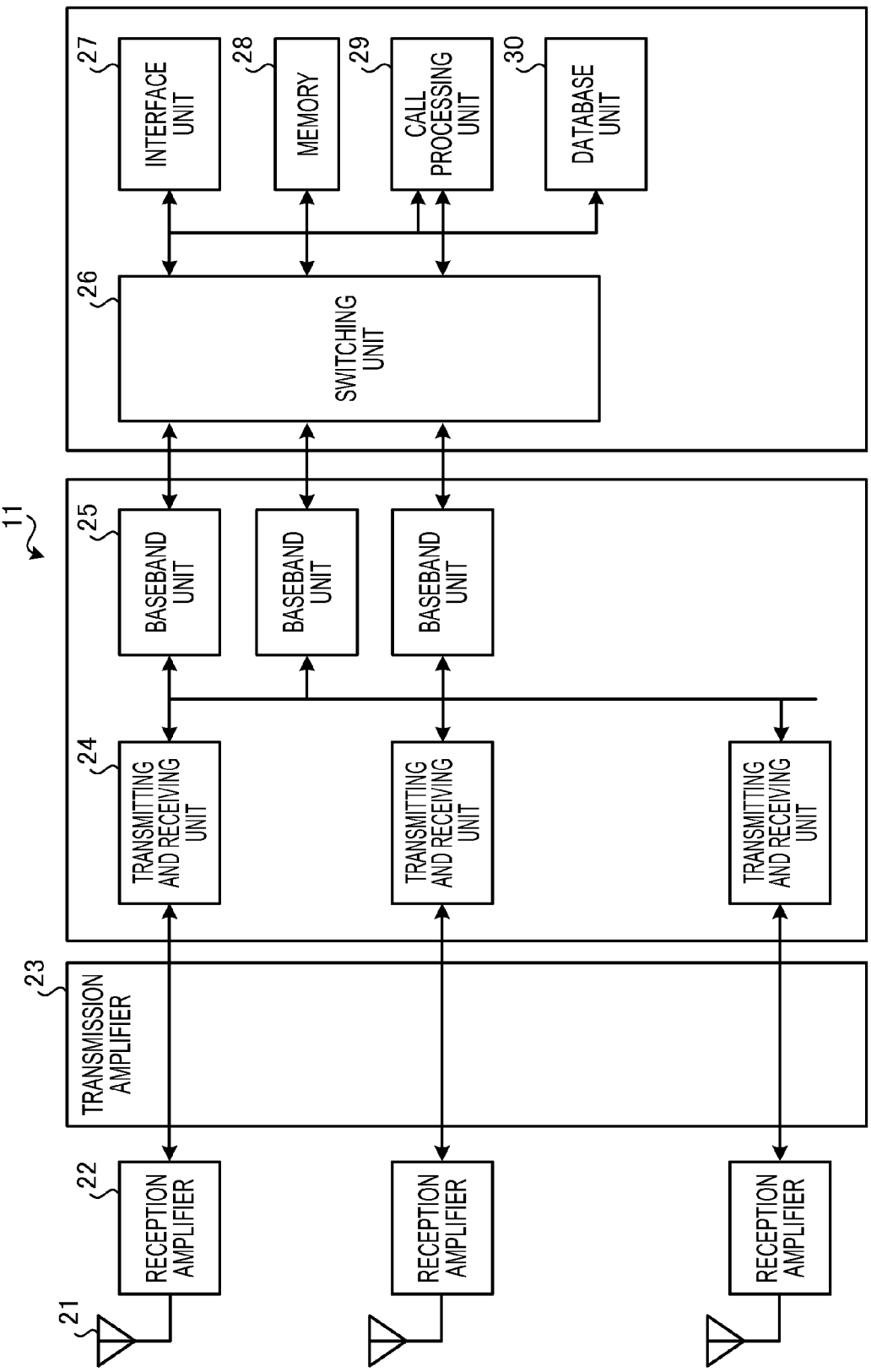
FIG. 5 is a block diagram illustrating a configuration of a wireless base transceiver station according to the second embodiment.

FIG. 5 is a block diagram illustrating a configuration of the wireless base transceiver station 11 according to the second embodiment. As illustrated in FIG. 5, the wireless base transceiver station 11 includes antennas 21, reception amplifiers (mast head amplifiers) 22, a transmission amplifier (transmit power amplifier) 23, transmitting and receiving units (transmitter receivers) 24, baseband units 25, a switching unit 26, an interface unit (highway interface) 27, a memory (common memory) 28, a call processing unit 29, and a database unit 30. The baseband units 25 each operate as a radio communication unit. The interface unit 27 operates as a fixed-line communication unit. The call processing unit 29 operates as a control unit. In the example illustrated in FIG. 5, there are three each of the antennas 21, the reception amplifiers 22, the transmitting and receiving units 24, and the baseband units 25, respectively. However, the number of each may be one, two, four, or more, respectively.

The wireless base transceiver station 11 is connected to the radio zone through the antenna 21. The wireless base transceiver station 11 is connected to the fixed-line zone through the interface unit 27. The baseband unit 25 measures radio quality in the radio zone. The interface unit 27 measures the amount of data flow in the fixed-line zone. Also, the interface unit 27 performs flow control on data in the fixed-line zone. The call processing unit 29 controls flow control performed by the interface unit 27. All or part of the memory 28 is used as the above-described buffer for temporarily holding data to be transferred. The database unit 30 stores parameters desired for flow control and data for calculating parameters desired for flow control.

Data Transfer Procedure in Wireless Base Transceiver Station

Figure 6:
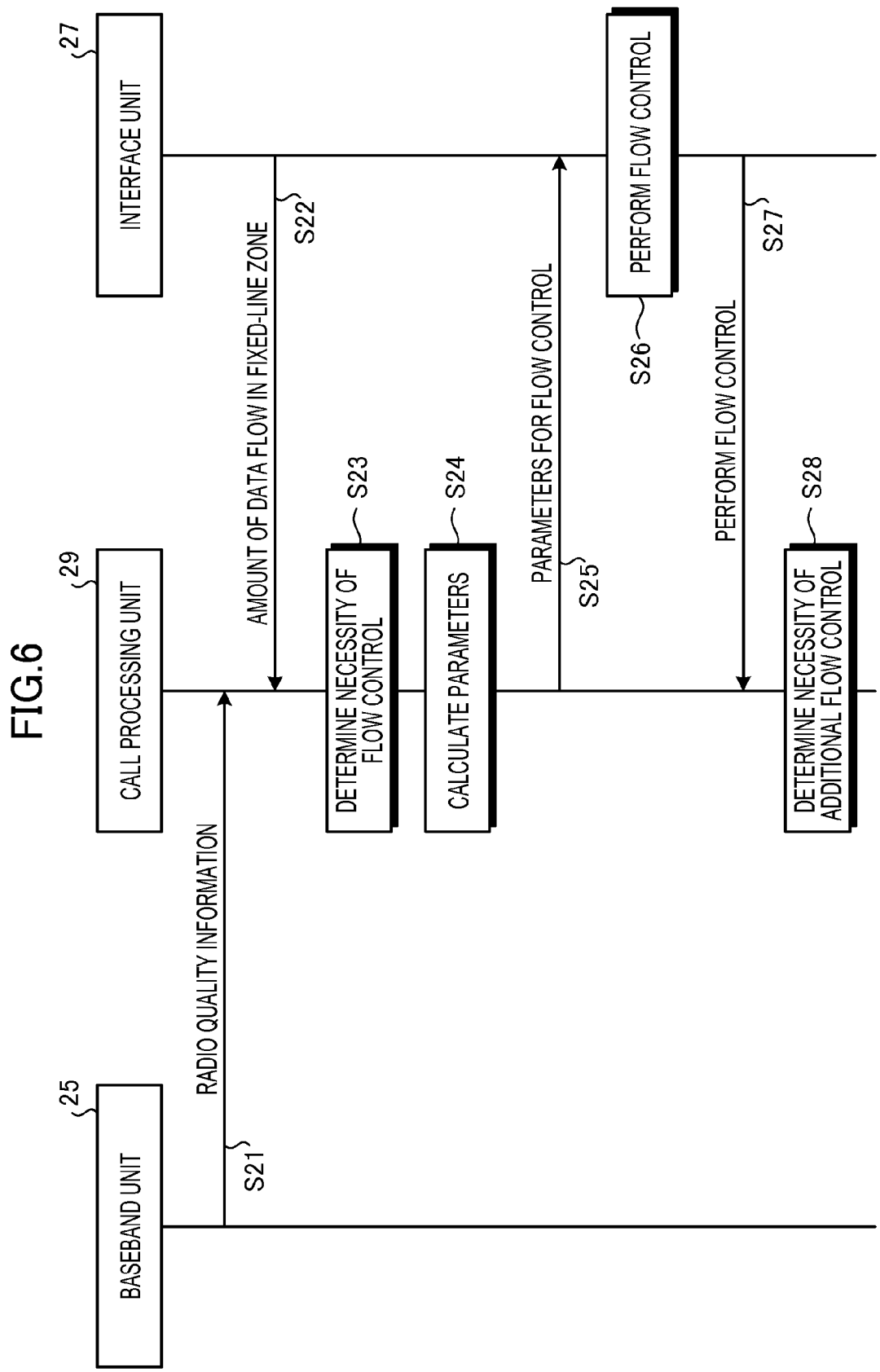
FIG. 6 is a sequence diagram illustrating a data transfer procedure in the wireless base transceiver station according to the second embodiment.

FIG. 6 is a sequence diagram illustrating a data transfer procedure in the wireless base transceiver station 11 according to the second embodiment. As illustrated in FIG. 6, upon start of a data transfer process, the baseband unit 25 measures radio quality in the radio zone. The baseband unit 25 reports, to the call processing unit 29, information about the measured radio quality in the radio zone (step S21). The interface unit 27 measures the amount of data flow in the fixed-line zone. The interface unit 27 reports, to the call processing unit 29, the measured amount of data flow in the fixed-line zone (step S22). Step S21 and step S22 may be performed at the same time, or step S21 may be performed after step S22.

Based on the radio quality in the radio zone and the amount of data flow in the fixed-line zone that have been reported from the baseband unit 25 and the interface unit 27, respectively, the call processing unit 29 determines whether it is desired to perform flow control on data in the fixed-line zone (step S23). If flow control is determined not to be desired, flow control is not performed. If flow control is determined to be desired, the call processing unit 29 calculates parameters desired for flow control (step S24). The call processing unit 29 reports the calculated parameters for flow control to the interface unit 27 (step S25). Based on the parameters received from the call processing unit 29, the interface unit 27 performs flow control on data in the fixed-line zone (step S26). The interface unit 27 reports the result of the flow control to the call processing unit 29 (step S27).

Based on the result received from the interface unit 27, the call processing unit 29 measures the number of times the flow control has been performed and determines the necessity of additional flow control. That is, the call processing unit 29 determines whether the flow control is to be continued (step S28). For example, if no improvement has been made even by consecutively performing flow control a predetermined number of times, the call processing unit 29 stops performing the flow control on target data. For example, if the amount of data flowing from the fixed-line zone into the wireless base transceiver station 11 has been successfully limited to an acceptable level, the call processing unit 29 determines that an improvement has been made. For example, if the amount of data flowing from the fixed-line zone into the wireless base transceiver station 11 has not been limited to an acceptable level, the call processing unit 29 determines that no improvement has been made.

Figure 7:
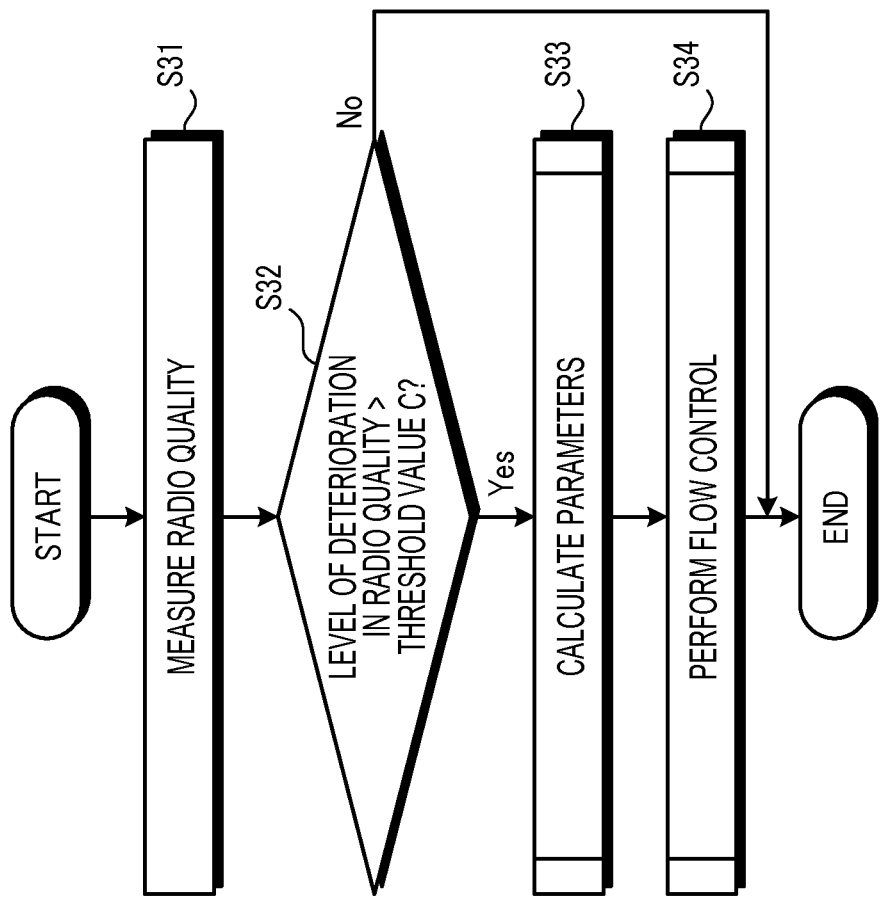
FIG. 7 is a flowchart illustrating a data transfer procedure in the wireless base transceiver station according to the second embodiment.

FIG. 7 is a flowchart illustrating a first example of a data transfer procedure in the wireless base transceiver station 11 according to the second embodiment. As illustrated in FIG. 7, the baseband unit 25 measures radio quality in the radio zone (step S31). The baseband unit 25 may measure the radio quality in the radio zone based on an error rate of data received by the wireless base transceiver station 11 from the radio zone. Alternatively, the baseband unit 25 may receive, from the mobile station 17, an error rate of data received by the mobile station 17 from the radio zone, so as to measure the radio quality based on the error rate received from the mobile station 17.

As the radio quality, for example, a cyclic redundancy check (CRC) error rate in a given period of time in an automatic request for repeat (ARQ) protocol may be measured. The ARQ is described, for example, in the 3GPP TS 36.300. Alternatively, for example, a CRC error rate (%) in a radio link control protocol data unit (RLC PDU), a block error rate (BLER), or a bit error rate (BER) may be used, as long as radio quality may be measured. Here, a CRC error rate in the ARQ protocol is used.

For example, by using the number of data packets received in a given period of time (i.e., the number of samples), a CRC error rate (%) may be calculated by the following equation:

$$\text{CRC error rate}(\%) = (\text{number of CRC reception errors})/(\text{number of samples}) \times 100$$

The call processing unit 29 determines whether the level of deterioration in radio quality exceeds a threshold value C (step S32) and determines whether flow control is to be performed. The threshold value C is determined, for example, by a wireless carrier in advance. For example, if the CRC error rate exceeds the threshold value C (YES in step S32), the call processing unit 29 determines that flow control is to be performed. On the other hand, if the CRC error rate does not exceed the threshold value C (NO in step S32), the call processing unit 29 determines that flow control is not to be performed. If it is determined that flow control is not to be performed, the data transfer process ends. If it is determined that flow control is to be performed, the call processing unit 29 performs a parameter calculation process described below (step S33). The interface unit 27 performs a flow control process described below (step S34). Then, the data transfer process ends.

In flow control, the number of packets flowing into the wireless base transceiver station 11 is controlled in accordance with a protocol that may control the amount of data flow. An example of such a protocol is the transmission control protocol (TCP), with which the amount of data flow may be controlled by a window size.

Examples of flow control methods include, but are not limited to, a tail drop method, a random early detection (RED) method, and a weighted random early detection (WRED) method. Here, the RED method or the WRED method is used as an example. In the RED method or the WRED method, the proportion of the number of data packets to be discarded to the number of received data packets varies with the amount of used or available buffer space. When the amount of used buffer space increases and reaches a threshold value (minimum threshold value), data packets that are targets of flow control begin to be discarded. When the amount of used buffer space further increases and reaches another threshold value (maximum threshold value), all the data packets that are targets of flow control are discarded. An initial minimum threshold value and an initial maximum threshold value are determined, for example, by the wireless carrier in advance. The proportion of data packets to be discarded when the amount of used buffer space is between the minimum threshold value and the maximum threshold value is determined, for example, by the wireless carrier in advance.

Figure 8:
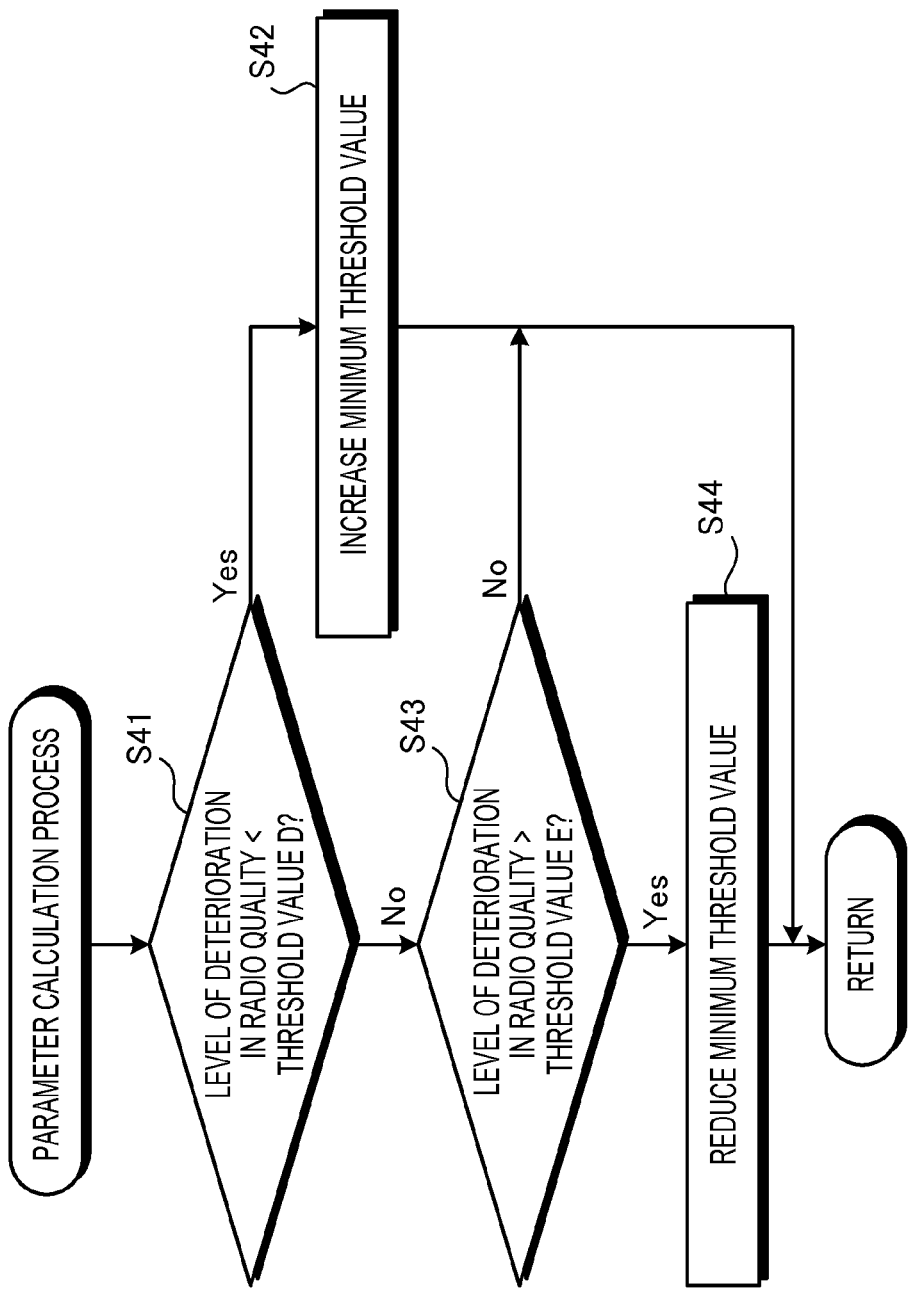
FIG. 8 is a flowchart illustrating a parameter calculation procedure in the wireless base transceiver station according to the second embodiment.

FIG. 8 is a flowchart illustrating a parameter calculation procedure in the wireless base transceiver station 11 according to the second embodiment. As illustrated in FIG. 8, in the parameter calculation process, the call processing unit 29 determines whether the level of deterioration in radio quality is lower than a threshold value D (step S41). The threshold value D is determined, for example, by the wireless carrier in advance. For example, if the CRC error rate is lower than the threshold value D (YES in step S41), the call processing unit 29 increases the minimum threshold value in the RED method or in the WRED method (step S42). Then, the process returns to the flowchart of FIG. 7. On the other hand, if the CRC error rate is higher than or equal to the threshold value D (NO in step S41), the call processing unit 29 further determines whether the level of deterioration in radio quality is higher than a threshold value E (step S43). The threshold value E is a value greater than the threshold value D and is determined, for example, by the wireless carrier in advance. For example, if the CRC error rate is lower than or equal to the threshold value E (NO in step S43), the process returns to the flowchart of FIG. 7. On the other hand, if the CRC error rate is higher than the threshold value E (YES in step S43), the call processing unit 29 reduces the minimum threshold value (step S44). Then, the process returns to the flowchart of FIG. 7.

When the CRC error rate is lower than the threshold value D, radio quality in the radio zone is good. In this case, since the amount of transferable data in the radio zone increases, a larger number of data packets may be transmitted to the mobile station 17. This reduces the number of data packets accumulated in the buffer of the wireless base transceiver station 11. Therefore, by increasing the minimum threshold value, it is possible to delay the timing of starting the flow control on data flowing from the fixed-line zone into the wireless base transceiver station 11. When the CRC error rate is higher than the threshold value E, radio quality in the radio zone is bad. In this case, since the amount of transferable data in the radio zone decreases, the number of data packets accumulated in the buffer increases. Therefore, by reducing the minimum threshold value to advance the timing of starting the flow control, it is possible to avoid or delay the situation where no buffer space is left.

Figure 9:
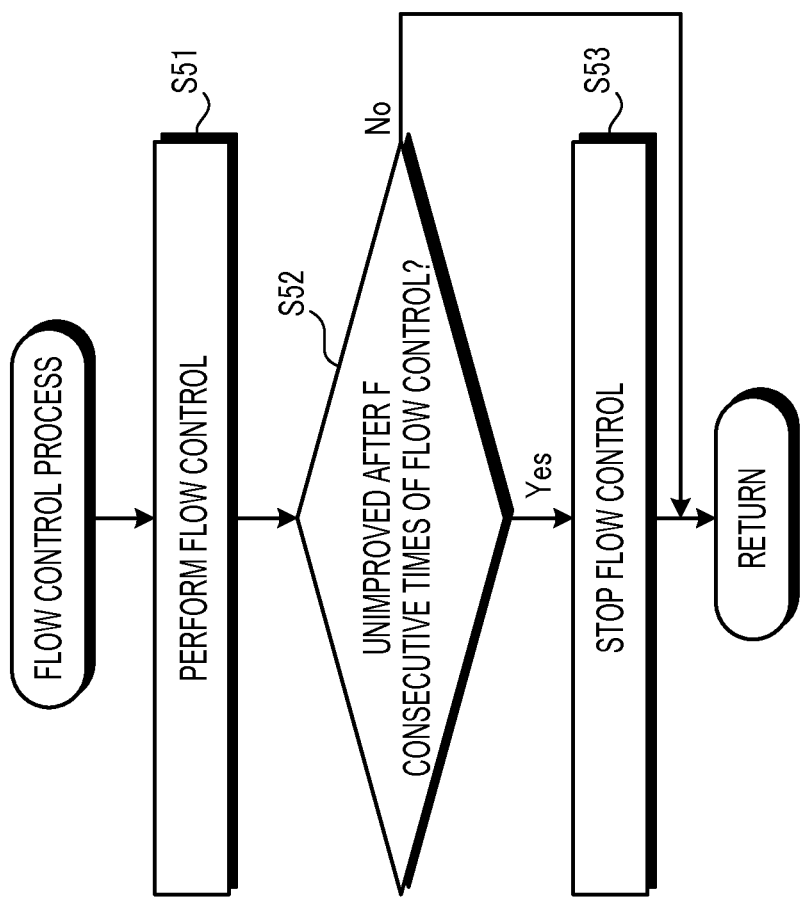
FIG. 9 is a flowchart illustrating a flow control procedure in the wireless base transceiver station according to the second embodiment.

FIG. 9 is a flowchart illustrating a flow control procedure in the wireless base transceiver station 11 according to the second embodiment. In the flow control process, the call processing unit 29 reports flow control parameters calculated in the parameter calculation process to the interface unit 27. As illustrated in FIG. 9, the interface unit 27 performs flow control on target data in the fixed-line zone (step S51). The interface unit 27 reports the result of the flow control to the call processing unit 29. Based on the result received from the interface unit 27, the call processing unit 29 measures the number of times the flow control has been performed. Then, the call processing unit 29 determines whether any improvement has been made by performing the flow control (step S52).

If the call processing unit 29 determines that an improvement has been made during F consecutive times of flow control performed on the same target data (NO in step S52), the process returns to the flowchart of FIG. 7. On the other hand, if the call processing unit 29 determines that no improvement has been made even by performing the flow control on the same target data F consecutive times (YES in step S52), the call processing unit 29 determines that a control abnormality has occurred. The call processing unit 29 then determines that no further flow control is to be performed on this target data. The call processing unit 29 stops performing the flow control on this target data (step S53), and the process returns to the flowchart of FIG. 7. The value of F is determined, for example, by the wireless carrier in advance.

When a plurality of service is to be subject to flow control, the services may be processed, for example, using the WRED method described above. With the WRED method, flow control may be performed on each of the plurality of services to be subject to flow control. Although a description will be given of the case where two services are to be subject to flow control, the same applies to the case where three or more services are to be subject to flow control.

Figure 10:
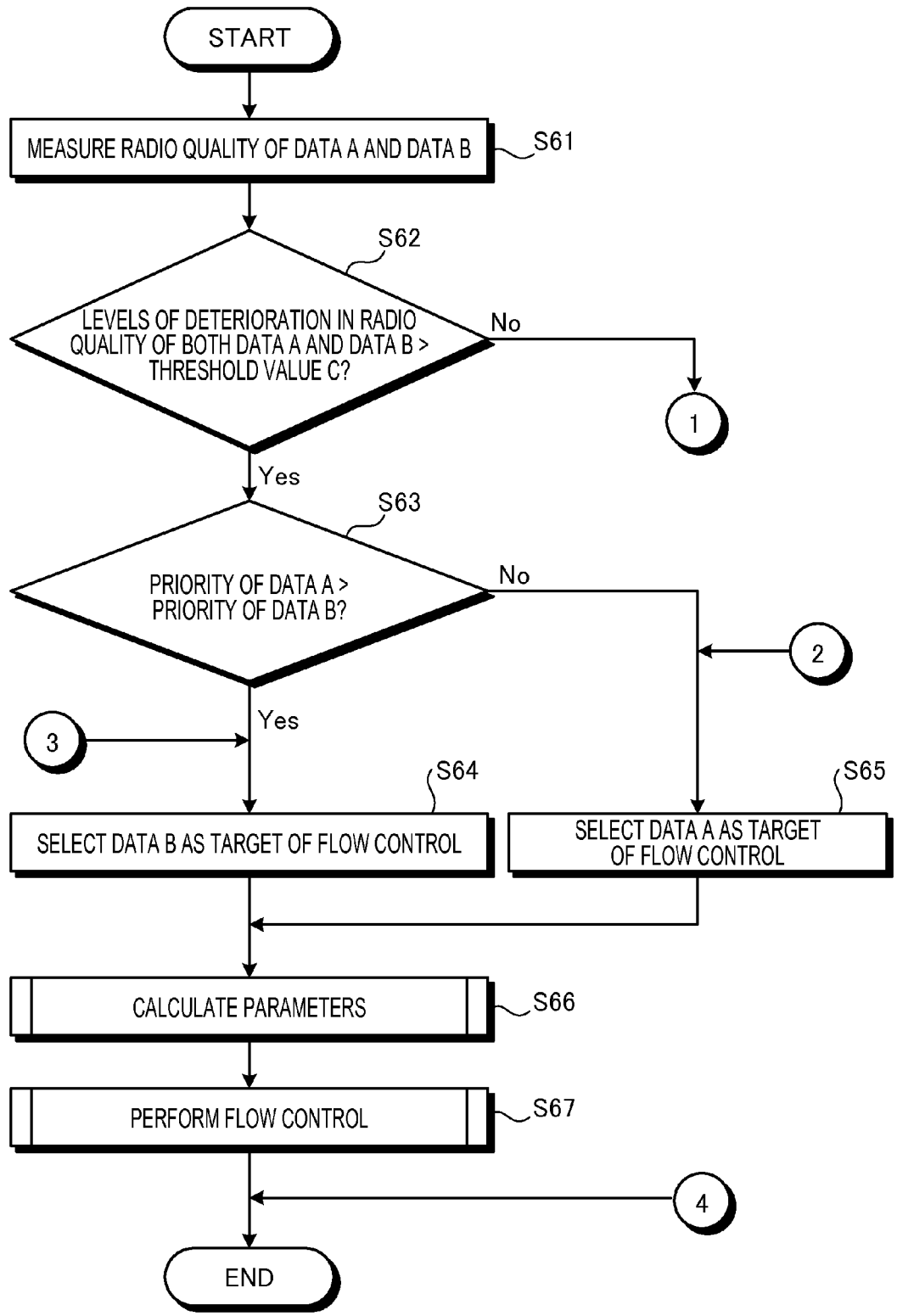
FIG. 10 is a flowchart illustrating another data transfer procedure in the wireless base transceiver station according to the second embodiment.
Figure 11:
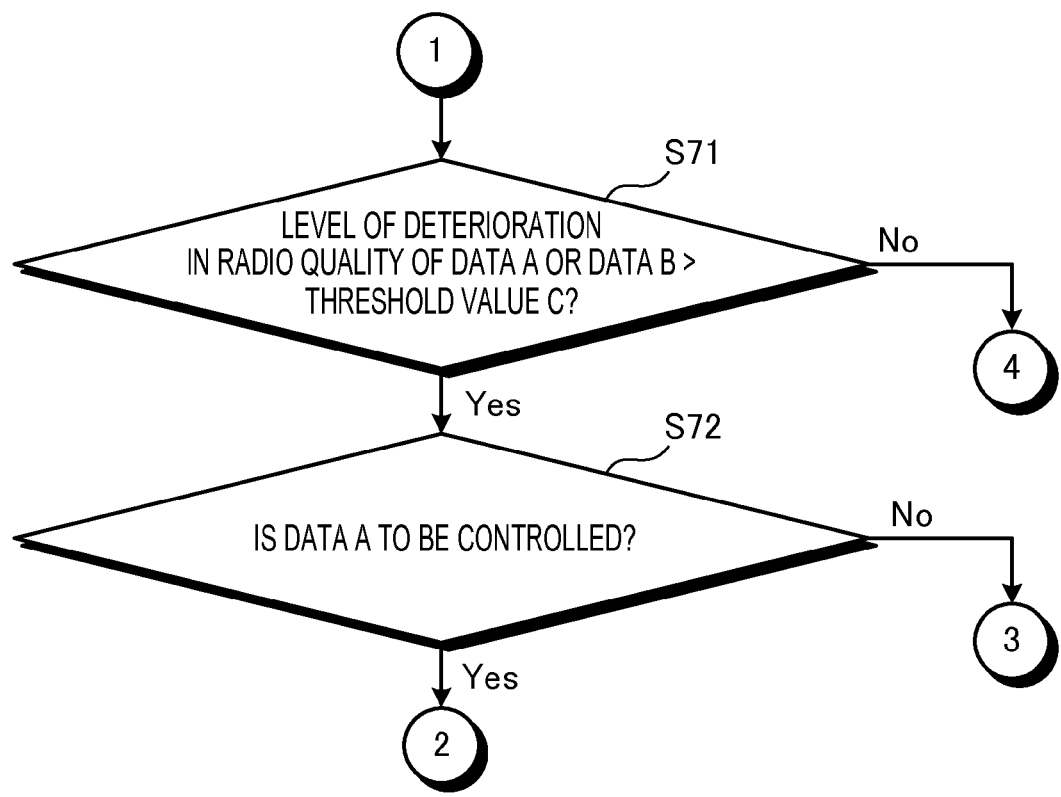
FIG. 11 is a flowchart illustrating the data transfer procedure in the wireless base transceiver station according to the second embodiment.

FIG. 10 and FIG. 11 are flowcharts illustrating a second example of a data transfer procedure in the wireless base transceiver station 11 according to the second embodiment. As illustrated in FIG. 10, for a service to which data A belongs and a service to which data B belongs, the baseband unit 25 measures radio quality in the radio zone (step S61). The measurement of the radio quality is performed in the same manner as that described in step S31 of the flowchart illustrated in FIG. 7. The service to which data A belongs is different from the service to which data B belongs.

Next, for data A, the call processing unit 29 determines whether the level of deterioration in radio quality exceeds the threshold value C. Also, for data B, the call processing unit 29 determines whether the level of deterioration in radio quality exceeds the threshold value C. The determination as to whether the level of deterioration in radio quality exceeds the threshold value C is made in the same manner as that described in step S32 of the flowchart illustrated in FIG. 7. The threshold value C is determined, for example, by a wireless carrier in advance. The threshold value C for data A and the threshold value C for data B may either be the same value or different values appropriate for data A and data B. For both data A and data B, the call processing unit 29 determines whether the level of deterioration in radio quality exceeds the threshold value C (step S62).

If the levels of deterioration in radio quality of both data A and data B exceed the threshold value C (YES in step S62), the call processing unit 29 compares the priority of data A with that of data B (step S63). For example, the wireless carrier may determine the priority of each data in advance. If the priority of data A is higher than that of data B (YES in step S63), the call processing unit 29 selects data B as a target of flow control (step S64). On the other hand, if the priority of data B is higher than that of data A (NO in step S63), the call processing unit 29 selects data A as a target of flow control (step S65).

If the level of deterioration in radio quality of at least one of data A and data B does not exceed the threshold value C (NO in step S62), the process proceeds to the flowchart of FIG. 11. As illustrated in FIG. 11, the call processing unit 29 determines whether the level of deterioration in radio quality of one of data A and data B exceeds the threshold value C (step S71). If the levels of deterioration in radio quality of both data A and data B do not exceed the threshold value C (NO in step S71), the data transfer process ends. If the level of deterioration in radio quality of one of data A and data B exceeds the threshold value C (YES in step S71), the call processing unit 29 determines whether data to be subject to flow control is data A (step S72). Data is subject to flow control when the level of deterioration in its radio quality exceeds the threshold value C. If the level of deterioration in radio quality of data A exceeds the threshold value C (YES in step S72), the call processing unit 29 selects data A as a target of flow control (step S65). If the level of deterioration in radio quality of data B exceeds the threshold value C (NO in step S72), the call processing unit 29 selects data B as a target of flow control (step S64).

When data to be subject to flow control is selected in step S64 or step S65, the call processing unit 29 performs a parameter calculation process (step S66). After the interface unit 27 performs a flow control process (step S67), the data transfer process ends. The parameter calculation process of step S66 is performed in the same manner as that described in the flowchart of FIG. 8. The threshold value D and the threshold value E in the parameter calculation process are set for each data selected as a target of flow control. The flow control process of step S67 is performed in the same manner as that described in the flowchart of FIG. 9. Both data A and data B may be subject to flow control. In this case, the proportion of lower-priority data to be discarded by flow control may be made higher than that of higher-priority data to be discarded by flow control. To realize this, the WRED method may assign smaller minimum threshold values to lower-priority data.

The second embodiment has an effect similar to that of the first embodiment. In the second embodiment, by assigning different priorities to different pieces of data, flow control may be performed on services that are weighted differently. Thus, even when radio quality in the radio zone is bad, data belonging to high-priority services, such as emergency calls, may be prevented from being discarded. Other examples of the high-priority services include services which require immediacy, such as disaster information notification services and services used for communication between police and fire departments in the events of disasters. Even when another wireless base transceiver station 14 and the upper device 15 do not limit the amount of data transmitted to the wireless base transceiver station 11, performing flow control on data in the fixed-line zone makes it possible to reduce the possibility that data in the fixed-line zone is discarded. Thus, reliability of communication may be improved.

According to the embodiments described above, the amount of transferable data in the radio zone between the wireless base transceiver station and the mobile station may be balanced with the amount of data flow in the fixed-line zone between the wireless base transceiver station and the external device. While the term "mobile station" is used throughout, this does not imply that the stations is required to be mobile. The "mobile station" may be any terminal which receives data in the radio zone from the wireless base transceiver station.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless base transceiver station that communicates with a mobile station by wireless communication and communicates with an external device via a fixed-line, the wireless base transceiver station comprising:
    an antenna that transmits and receives data to and from the mobile station by using a radio zone between the wireless base transceiver station and the mobile station; and
    a processor that executes a process including:
    a radio communication process configured to measure radio quality in the radio zone between the wireless base transceiver station and the mobile station based on an error rate of data received from the radio zone, an amount of transferable data in the radio zone being determined by the radio quality;
    a fixed-line communication process configured to measure an amount of data flow in a fixed-line zone between the wireless base transceiver station the external device and perform a flow control on data in the fixed-line zone; and
    a control process configured to control the flow control on data flowing through the fixed-line from the external device toward the wireless base transceiver station, the data flowing through the fixed-line being in relation to the amount of data flow in the fixed-line zone and the radio quality in the radio zone.

2. The wireless base transceiver station according to claim 1, wherein the radio quality in the radio zone is based on an error rate of data received from the mobile station.

3. The wireless base transceiver station according to claim 1, wherein the radio quality in the radio zone is based on an error rate of data received by the mobile station.

4. The wireless base transceiver station according to claim 1, wherein the control process adjusts a proportion of data to be discarded in accordance with a priority of the data in the fixed-line zone.

5. The wireless base transceiver station according to claim 1, wherein the control process includes determining timing for starting restriction of data reception from the external device based on the amount of data flow in the fixed-line zone and the radio quality in the radio zone.

6. The wireless base transceiver station according to claim 5, further comprising a buffer to temporarily store data received from the fixed-line zone, a destination of which being the mobile station, and
    wherein the fixed-line communication process includes starting performing the flow control when an amount of data stored in the buffer exceeds a threshold, the threshold being determined based on the radio quality of the radio zone.

7. The wireless base transceiver station according to claim 1, wherein the radio communication process includes obtaining the radio quality by dividing a total number of errors detected by a cyclic redundancy check by a total number of packets received from the mobile station.

8. A communication system comprising:
a wireless base transceiver station;
a mobile station configured to transmit and receive data to and from the wireless base transceiver station via radio communication; and
an external device configured to transmit and receive data to and from the wireless base transceiver station via fixed-line communication,
wherein the wireless base transceiver station is configured to:
measure radio quality in a radio zone between the wireless base transceiver station and the mobile station based on an error rate of data received from the radio zone, an amount of transferable data in the radio zone being determined by the radio quality;
measure an amount of data flow in a fixed-line zone between the wireless base transceiver station and the external device and perform a flow control on data in the fixed-line zone; and
control the flow control on data flowing through the fixed-line from the external device toward the wireless base transceiver station, the data flowing through the fixed-line being in relation to the amount of data flow in the fixed-line zone and the radio quality of the radio zone.

9. The communication system according to claim 8, wherein the wireless base transceiver station measures radio quality in the radio zone based on an error rate of data received from the mobile station.

10. The communication system according to claim 8, wherein the wireless base transceiver station measures radio quality in the radio zone based on an error rate of data received by the mobile station.

11. The communication system according to claim 8, wherein the wireless base transceiver station adjusts a proportion of data to be discarded in accordance with a priority of the data in the fixed-line zone.

12. A data transfer method executed by a processor included in a wireless base transceiver station that communicates with a mobile station by wireless communication and communicates with an external device via a fixed-line, the data transfer method comprising:
measuring radio quality in a radio zone between the wireless base transceiver station and the mobile station based on an error rate of data received from the radio zone, an amount of transferable data in the radio zone being determined by the radio quality;
measuring an amount of data flow in a fixed-line zone between the wireless base transceiver station and the external device and performing a flow control on data in the fixed-line zone; and
controlling the flow control on data flowing through the fixed-line from the external device toward the wireless base transceiver station, the data flowing through the fixed-line being in relation to the amount of data flow in the fixed-line zone and the radio quality in the radio zone.

13. The data transfer method according to claim 12, wherein the radio quality in the radio zone is measured based on an error rate of data received from the mobile station.

14. The data transfer method according to claim 12, wherein the radio quality in the radio zone is measured based on an error rate of data received by the mobile station.

15. The data transfer method according to claim 12, wherein a timing of starting the flow control is adjusted in accordance with the radio quality in the radio zone.

16. The data transfer method according to claim 12, wherein a proportion of data to be discarded is adjusted in accordance with a priority of the data in the fixed-line zone.

17. A wireless base transceiver station that communicates with a mobile station by wireless communication and communicates with an external device via a fixed-line, the wireless base transceiver station comprising:
an antenna that transmits and receives data to and from the mobile station by using a radio zone between the wireless base transceiver station and the mobile station; and
a processor coupled to the antenna and configured to:
measure radio quality in the radio zone based on an error rate of data received from the radio zone, an amount of transferable data in the radio zone being determined by the radio quality;
measure an amount of data flow in a fixed-line zone between the wireless base transceiver station and the external device and perform a flow control on data in the fixed-line zone; and
control the flow control on data flowing through the fixed-line from the external device toward the wireless base transceiver station, the data flowing through the fixed-line being in relation to the amount of data flow in the fixed-line zone and the radio quality,
wherein the processor is configured to control the amount of data flowing through the fixed-line so as to delay a timing for starting restriction of data reception from the external device in a case when the radio quality is good, and control the amount of data flowing through the fixed-line so as to advance the timing when the radio quality is worse than the case.

\* \* \* \* \*